United States Patent

Honma

Patent Number: 5,697,724
Date of Patent: Dec. 16, 1997

[54] METAL FITTING STRUCTURE FOR ANCHORING A CHAIN TO A PORTABLE APPARATUS

[75] Inventor: Yasuyuki Honma, Shizuoka, Japan

[73] Assignee: NEC Corporation, Tokyo, Japan

[21] Appl. No.: 654,271

[22] Filed: May 28, 1996

[30] Foreign Application Priority Data

May 29, 1995 [JP] Japan .................... 7-130146

[51] Int. Cl.$^6$ .................................. F16C 11/00
[52] U.S. Cl. .................. 403/150; 403/119; 24/265 AL; 24/3.6
[58] Field of Search .................. 24/3.11, 3.6, 3.7, 24/265 AL, 703.1, 186, 198; 403/24, 65, 79, 119, 150, 107, 161, 152, 153, 154, 155

[56] References Cited

U.S. PATENT DOCUMENTS

| | | | |
|---|---|---|---|
| 1,621,076 | 3/1927 | Lotz | 24/265 AL |
| 1,717,295 | 6/1929 | Wolf | 24/265 AL |
| 4,005,904 | 2/1977 | Weman et al. | 24/265 AL X |
| 4,407,148 | 10/1983 | Rousseau | 24/3.6 X |
| 4,516,418 | 5/1985 | Cuttler | 24/3.6 X |
| 4,523,443 | 6/1985 | Momemers | 24/3.6 X |

FOREIGN PATENT DOCUMENTS

| | | | |
|---|---|---|---|
| 3-4059 | 2/1991 | Japan . | |
| 4-40293 | 9/1992 | Japan . | |
| 1433279 | 4/1976 | United Kingdom | 24/265 AL |

*Primary Examiner*—Harry C. Kim
*Attorney, Agent, or Firm*—Whitham, Curtis, Whitham & McGinn

[57] ABSTRACT

To anchor a chain clip to the casing of a radio pager, a generally C-shaped plastically deformable metal fitting has its opposite ends rotatably fitted in a hole formed in the casing. The metal fitting is fully received in a recess also formed in the casing when rotated about the hole to a position substantially flush with the surface of the casing. When the chain clip is used, the metal fitting is pulled out of the recess, and then the chain clip is anchored to the fitting.

9 Claims, 4 Drawing Sheets

King 5,697,724

METAL FITTING STRUCTURE FOR ANCHORING A CHAIN TO A PORTABLE APPARATUS

BACKGROUND OF THE INVENTION

The present invention relates to the structure of a metal fitting for anchoring a chain to a radio pager or similar portable apparatus for preventing the apparatus from being dropped.

When a radio pager, for example, is put in the user's pocket or bag during transport, a chain clip is usually anchored to the casing of the pager in order to prevent the pager from being dropped. The chain clip consists of a chain and a clip affixed to one end of the chain. The clip is used to attach to, for example, the edge of the user's pocket. The other end of the chain is hung on the casing of the pager via a metal fitting mounted on the casing.

Metal fittings for the above application are disclosed in, e.g., Japanese Utility Model Publication Nos. 4-40293 and 3-4059. However, the conventional metal fittings are expensive because they each need a plurality of constituent parts. Other problems with the conventional metal fittings are that their mechanical strength is not sufficient, that they are not convenient to use, and that they are not attractive in appearance.

SUMMARY OF THE INVENTION

It is therefore an object of the present invention to provide a metal fitting structure for a portable apparatus, having a single metal fitting which can be mounted to any desired portion other than an engaging portion, having a sufficient mechanical strength, reduces cost, and having an attractive appearance.

A metal fitting structure for anchoring a chain to a portable apparatus of the present invention has a metal fitting having a preselected configuration for anchoring the chain to the portable apparatus. A hole is formed in a part of the casing of the apparatus for rotatably fitting the metal fitting therein. A recess is also formed in the casing for receiving the metal fitting in a position substantially flush with the surface of the casing.

BRIEF DESCRIPTION OF THE DRAWINGS

The above and other objects, features and advantages of the present invention will become more apparent from the following detailed description taken with the accompanying drawings in which.

In the figures, like reference numerals designate like constituent parts.

DESCRIPTION OF THE PREFERRED EMBODIMENT

Figure 1:
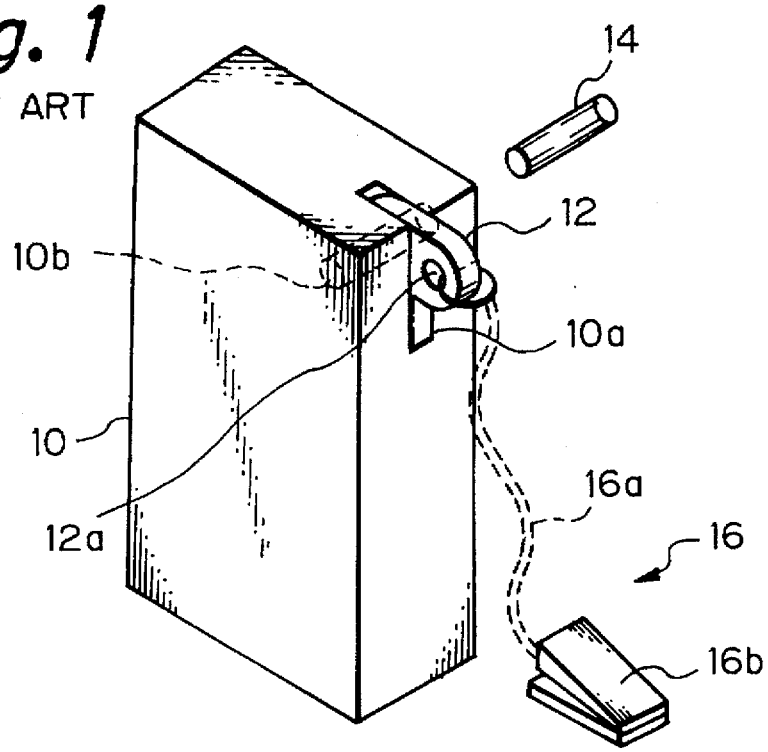
FIGS. 1 and 2 are perspective views each showing a particular conventional metal fitting structure.

To better understand the present invention, a brief reference will be made to a conventional metal fitting structure taught in the previously mentioned Japanese Utility Model Publication No. 4-40293. As shown in FIG. 1, a metal fitting 12 is mounted on a casing 10 included in, e.g., a radio pager. The metal fitting 12 is received in a slit-like groove 10a formed in the casing 10. The fitting 12 has an anchor hole 12a at one end and a fulcrum hole, not shown, at the other end. After the fulcrum hole of the fitting 12 has been aligned with a bore 10b formed in the casing 10, a pin 14 is inserted into the bore 10b. In this condition, the fitting 12 is rotatable about the pin 14 in the groove 10a. A chain clip 16 is made up of a chain 16a and a clip 16b affixed to one end of the chain 16a. The other end of the chain 16a is anchored to the hole 12a of the fitting 12. This kind of metal fitting structure, however, needs a plurality of members, i.e., the fitting 12 and pin 14 which increase the cost of the radio pager, as mentioned earlier.

Figure 2:
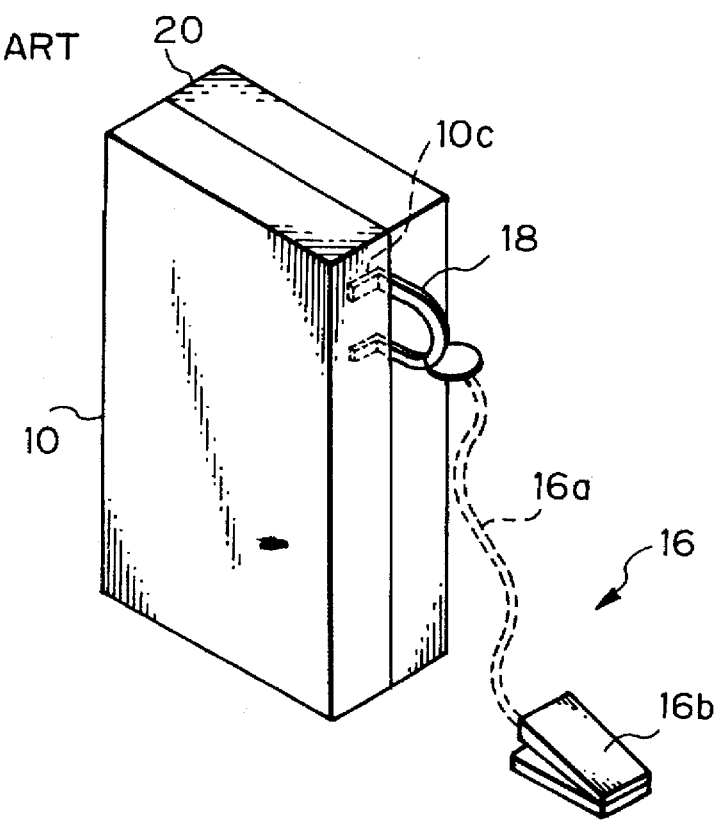

FIG. 2 shows another conventional metal fitting structure. As shown, a metal fitting 18 is nested in an engaging portion with its opposite ends received in holes 10c formed in the casing 10. The fitting 18 is held between the casing 10 and a cover 20. This configuration is inexpensive because the metal fitting 18 is implemented as a single member. However, when the chain clip 16 is not used, the fitting 18 simply constitutes a useless projection. As a result, the fitting 18 is not only obstructive when the radio pager is put in the user's pocket or bag, but also undesirable from the appearance standpoint.

Figure 3:
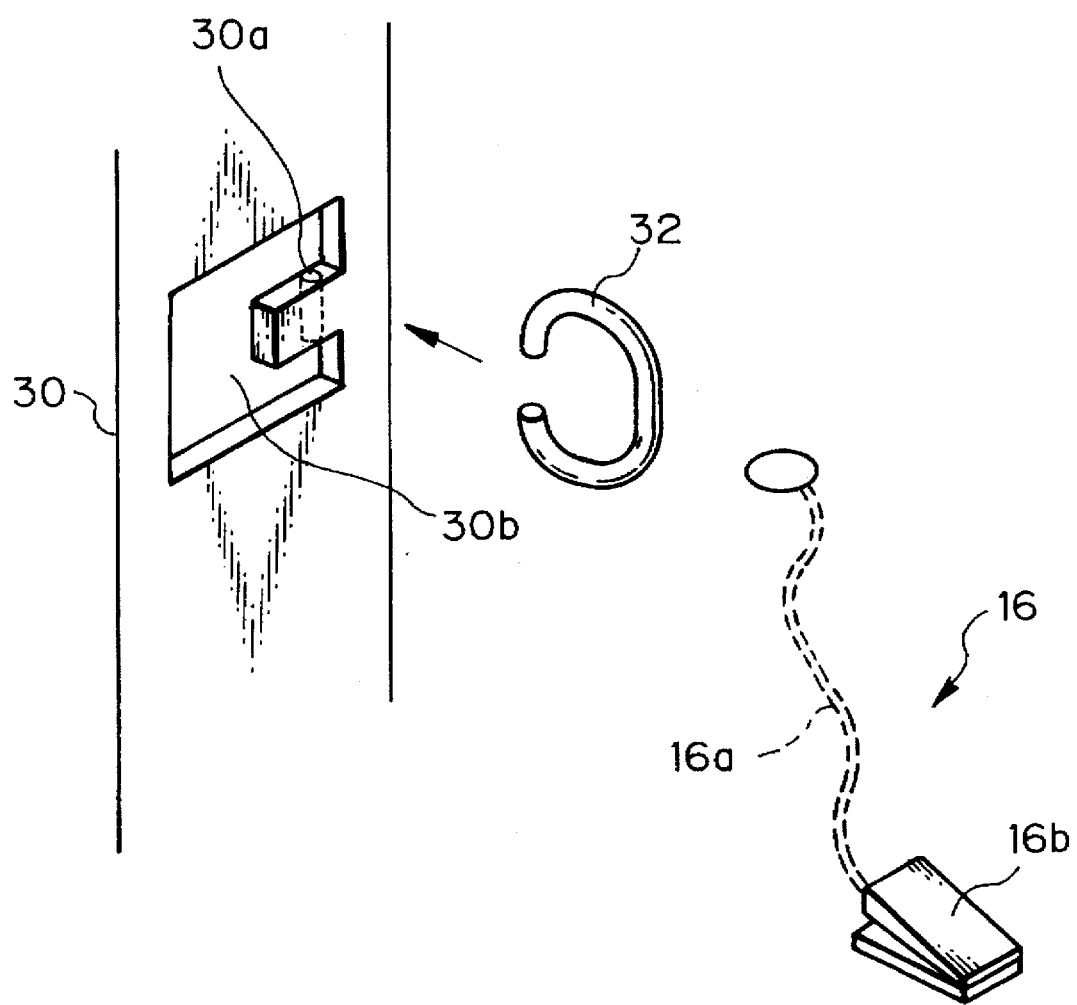
FIG. 3 is an exploded perspective view of a metal fitting structure embodying the present invention.

Referring to FIG. 3, a metal fitting structure for a chain clip and embodying the present invention will be described. As shown, a metal fitting 32 is a generally C-shaped plastically deformable member. A radio pager or similar portable apparatus has a casing 30 formed with a hole 30a and a recess 30b. The hole 30a allows the fitting 32 to be rotatably mounted to the casing 30. The recess 30b is sized as to accommodate the entire fitting 32 when the fitting 32 is rotated to a position substantially flush with the surface of the casing 30.

Figure 4:
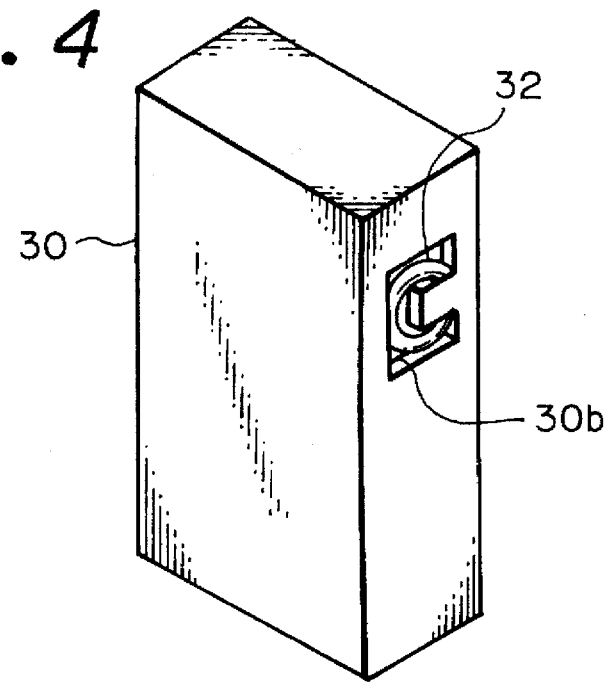
FIG. 4 is a perspective view showing a metal fitting of the embodiment received in a casing.
Figure 5:
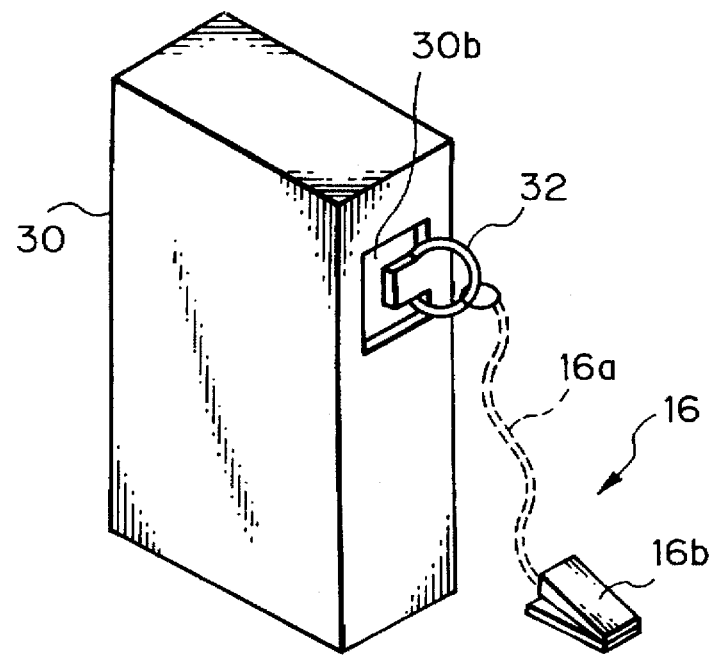
FIG. 5 is a perspective view showing the metal fitting of the embodiment pulled out of the casing, and a chain clip anchored to the metal fitting.

Specifically, the opposite ends of the C-shaped metal fitting 32 are press fitted in the hole 30a of the casing 30. When the fitting 32 is rotated into the recess 30b, the former is fully received in the latter, as shown in FIG. 4. When a chain clip 16 is to be used, the fitting 32 is pulled out of the recess 30b, and then the chain clip 16 is anchored to the fitting 32, as shown in FIG. 5.

The fitting 32 is press fitted in the hole 30a by the following procedure. First, the fitting 32 is located at a position shown in FIG. 6A. Then, the fitting 32 is pressed from the outside in two directions as indicated by arrows X and Y. As a result, the fitting 32 has its opposite ends fitted in the hole 30a in the configuration shown in FIG. 6B.

When the chain clip 16 is not used, the fitting 32 is rotated about the anchor hole 30b into the recess 30b of the casing 30, as shown in FIG. 4. In this position, the fitting 32 does not obstruct the transport of the radio pager. When the chain clip 16 is used, the fitting 32 is pulled out of the recess 30b, as shown in FIG. 5. Subsequently, the chain clip 16 is anchored to the fitting 32 via, e.g., a double ring.

A reference will be made to FIGS. 6A, 6B, 7A and 7B for describing an important configuration relating to the mechanical strength of the metal fitting 32. Assume that the fitting 32 having a configuration shown in FIG. 7A has its opposite ends press fitted in the hole 30a. Then, the fitting 32 is deformed, as shown in FIG. 7B. When the chain clip 16, not shown, which is anchored to the fitting 32 is pulled, the ends of the fitting 32 easily move away from each other. This kind of configuration may not be desirable due to the lack of tensile strength.

Figure 6A:
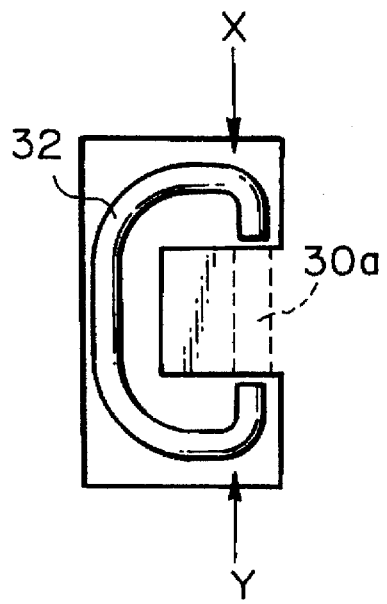
FIGS. 6A and 6B are front views of the metal fitting of the embodiment provided with a first configuration.
Figure 6B:
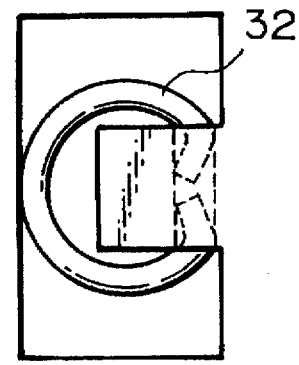
Figure 7A:
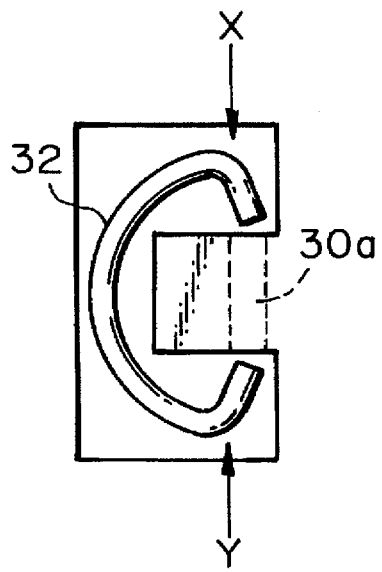
FIGS. 7A and 7B are front views of the metal fittings of the embodiment provided with a second configuration.
Figure 7B:
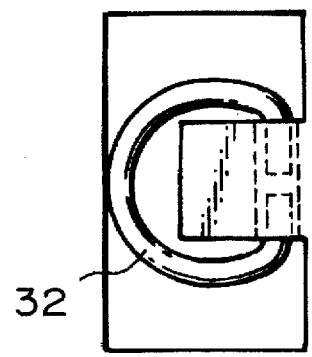

By contrast, when the fitting 32 having the configuration shown in FIG. 6A is pressed fitted in the hole 30a, it is deformed as shown in FIG. 6B. In this condition, the fitting 32 is round and desirable in appearance. Moreover, the opposite ends of the fitting 32 bite into the wall of the hole 30a by being bent inward, achieving a great tensile strength. The configuration of FIG. 6A therefore implements a desirable metal fitting.

In summary, it will be seen that the present invention provides a simple and inexpensive metal fitting implemented as a single member and capable of being mounted to any desired portion other than an engaging portion. Further, because the metal fitting is movable into and out of a recess, it provides a casing with an attractive appearance without regard to whether or not a chain clip is used.

Various modifications will become possible for those skilled in the art after receiving the teachings of the present disclosure without departing from the scope thereof. For example, the metal fitting 32 may be originally provided with the configuration shown in FIG. 6B and pressed in two directions opposite to the directions X and Y, FIG. 6A, until its opposite ends have been fitted in the hole 30a.

What is claimed is:

1. A structure for anchoring a chain to a portable structure, comprising:

a casing for said portable structure having a recess and a monolithically formed portion of said casing projecting into said recess and having a hole formed through said portion:

a ring-shaped metal fitting comprising a substantially continuous member projecting through said hole and having a gap therein, for anchoring the chain to the portable structure, wherein said recess, said portion, and said hole formed in said portion of the casing of the portable structure, are arranged and dimensioned relative to said ring-shaped metal fitting, so that said ring-shaped metal fitting is rotatably movable into said recess to a position substantially flush with a surface of said casing.

2. A structure according to claim 1, wherein said ring-shaped metal fitting comprises a plastically deformable member formed into a ring-shape with opposite ends at either end of said gap in said hole.

3. A structure according to claim 2, wherein said ring-shaped metal fitting is configured such that said opposite ends are received into a wall of said hole.

4. A structure according to claim 3, wherein said ring-shaped metal fitting has a generally C-shaped configuration.

5. A structure according to claim 1, wherein said ring-shaped metal fitting has a generally D-shaped configuration.

6. A structure according to claim 2, wherein said ring-shaped metal fitting has a generally D-shaped configuration.

7. A structure according to claim 3, wherein said ring-shaped metal fitting has a generally D-shaped configuration.

8. A structure according to claim 1, wherein said portion projects into said recess has a depth in a first direction substantially normal to an outer surface of said casing, and said portion projects in a second direction substantially parallel to said outer surface.

9. A structure according to claim 8, wherein said hole extends in a direction substantially parallel to said outer surface.

* * * * *